(12) United States Patent
Leteurtre et al.

(10) Patent No.: US 6,246,244 B1
(45) Date of Patent: Jun. 12, 2001

(54) METHOD AND DEVICE FOR MEASURING AXIAL DEVIATION IN A TAUT WIRE ALIGNMENT SYSTEM

(75) Inventors: Patrick Leteurtre, Montpellier; Frédéric Ossart, Nimes, both of (FR)

(73) Assignee: Nanotec Solution, Nimes (FR)

( * ) Notice: Subject to any disclaimer, the term of this patent is extended or adjusted under 35 U.S.C. 154(b) by 0 days.

(21) Appl. No.: 09/068,518

(22) PCT Filed: Nov. 13, 1996

(86) PCT No.: PCT/FR96/01787

§ 371 Date: May 11, 1998

§ 102(e) Date: May 11, 1998

(87) PCT Pub. No.: WO97/18438

PCT Pub. Date: May 22, 1997

(30) Foreign Application Priority Data

Nov. 13, 1995 (FR) .................................................. 95 13420

(51) Int. Cl.[7] .................................................. G01R 27/26
(52) U.S. Cl. .......................... 324/687; 324/662; 324/686; 324/71.1
(58) Field of Search .................... 324/661, 662, 324/686, 687, 71.1

(56) References Cited

U.S. PATENT DOCUMENTS 3,470,460   9/1969   Panofsky et al. .
4,542,334   9/1985   Nelson .
5,373,123 * 12/1994   Skalski ........................ 324/207.18 X

OTHER PUBLICATIONS

T. Mimashi et al., "The position monitor using stretched wire technique", pp. 2340–2342, IEEE Electrical Engineers, vol. 5, May 1993.

E.V. Aleksenko et al., "Capacitor gauge for measuring glass fiber diameter", pp. 548–550, Measurement Techniques, vol. 33, No. 6, Jun 1, 1990.

R. Sugahara et al., "Measurement of Seismic Motion and Displacement of the Floor at the TRISTAN Ring, and the Alignment Issues", pp. 211–215, National Laboratory for High Energy Physics, Nov. 17, 1992.

A. Korytov et al., "Multi–point wide–range precision alignment technique for the GEM detector", pp. 428–434, Nuclear Instruments and Methods in Physics Research, vol. 343, No. 2–3, Apr. 11, 1994.

V.K. Fedotov, "Diameter Gauge for Ultrafine Electrically Conducting Filaments", pp. 425–429, Soviet Journal of Nondestructive Testing, vol. 20, No. 7, Jul. 1994.

* cited by examiner

Primary Examiner—Glenn W. Brown
(74) Attorney, Agent, or Firm—Young & Thompson

(57) ABSTRACT

A method for measuring axial deviation in a taut-wire alignment system (1) that includes a dynamically grounded resistive wire (2) extending along a longitudinal reference axis and adjacent to elements to be aligned (3). The method comprises applying an AC voltage signal to a measurement electrode provided with a reference electrode, the measurement electrode being arranged in a measurement plane in a holder attached to an element to be aligned (3); carrying out a measurement using a capacitive bridge that includes a first capacitor consisting of the measurement electrode and the wire, as well as a second capacitor, in order to provide a measurement signal representing an axial position of the measurement electrode relative to the taut wire (2) ; and processing the measurement signal to provide data indicating the axial deviation between the element to be aligned (3, 7) and a predetermined alignment position. The method is particularly suitable for aligning elements in linear colliders.

15 Claims, 2 Drawing Sheets

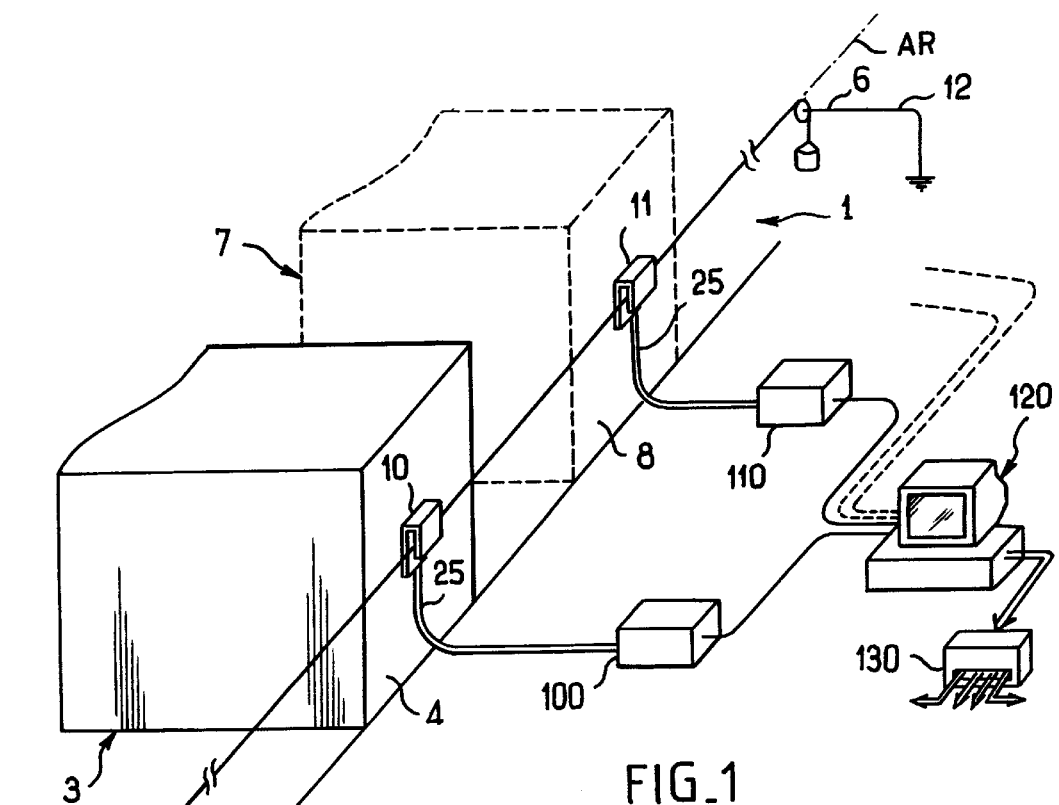
FIG_1
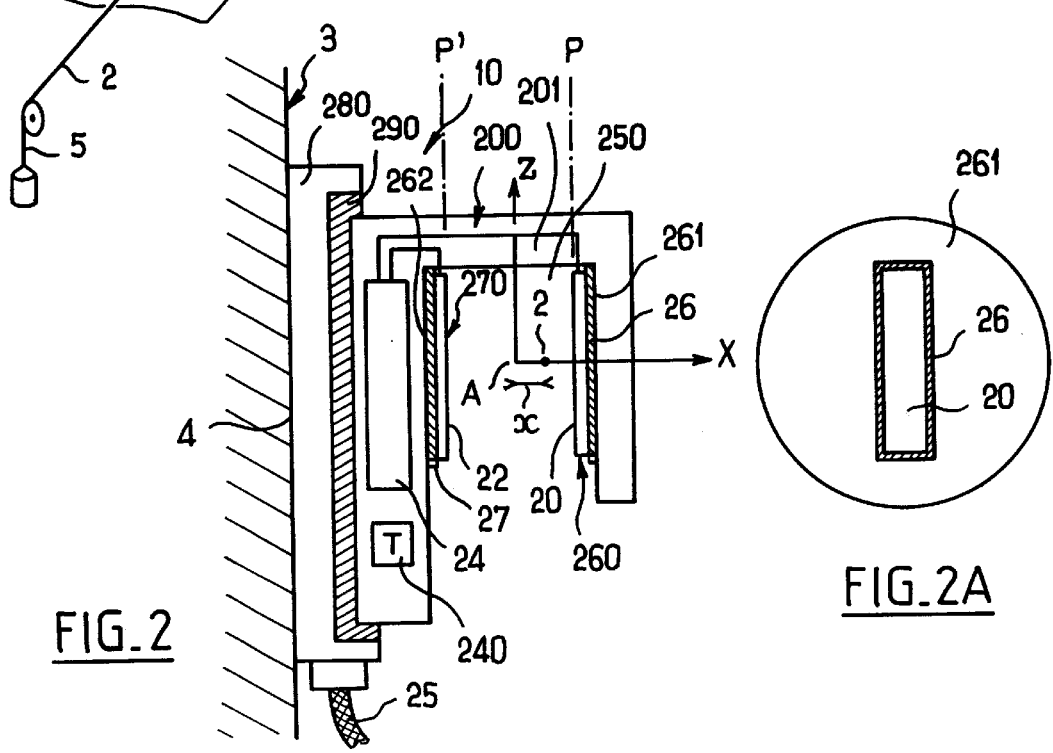
FIG_2    FIG_2A

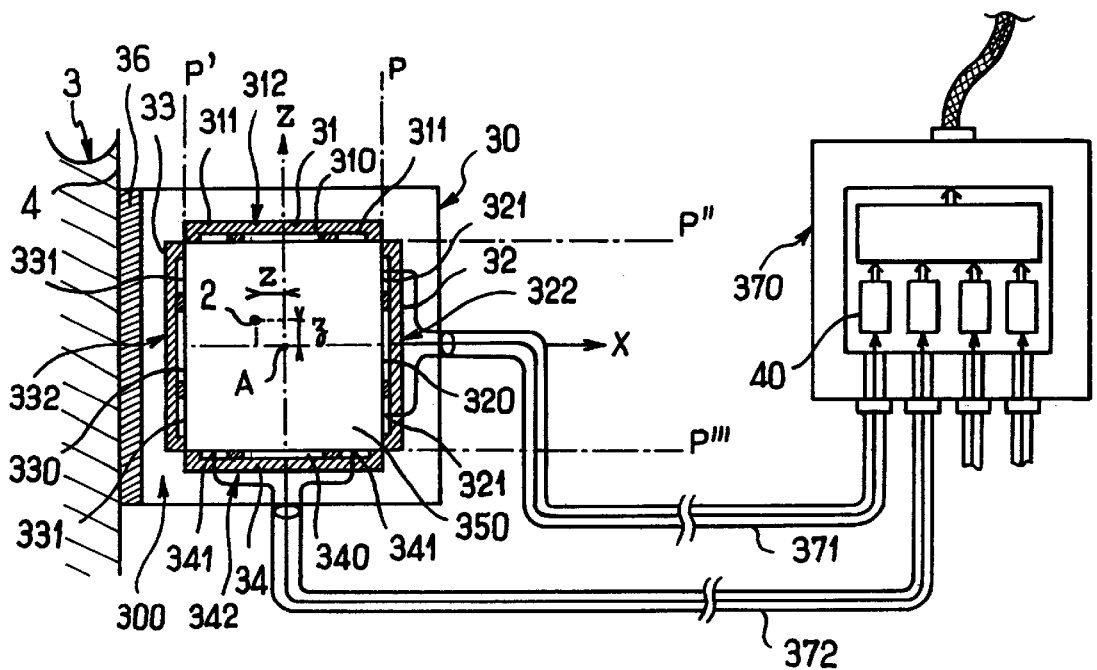
FIG_3
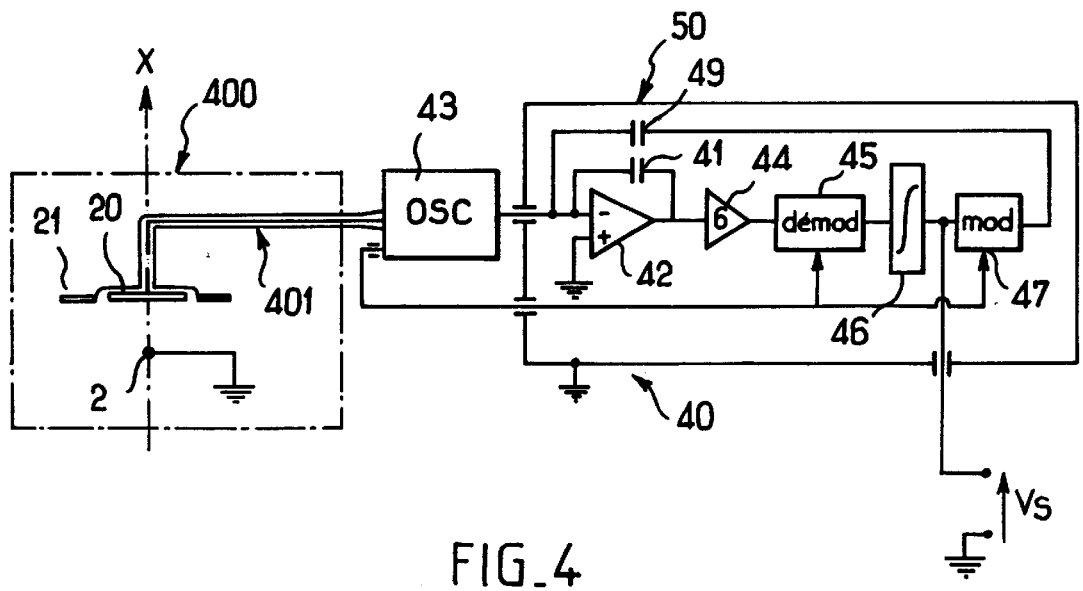
FIG_4

METHOD AND DEVICE FOR MEASURING AXIAL DEVIATION IN A TAUT WIRE ALIGNMENT SYSTEM

BACKGROUND OF THE INVENTION

1. Field of the Invention

The present invention relates to a method for measuring axial deviation in a taut wire alignment system. It also relates to a measuring device implementing this method and a taut wire alignment system including such measuring devices.

2. Description of the Related Art

In large instruments used in particle physics research, such as linear colliders, it is necessary to obtain a precise alignment of heavy elements such as magnet sections, over distances which can be as great as several hundred meters. For this purpose, there have been developed non-contact alignment systems making use of a wire stretched along the length of the elements to be aligned and devices for measuring deviation using optical or electrical techniques, in particular capacitive techniques. The present invention falls within the category of taut wire alignment systems using capacitive measuring techniques. In this context, a taut wire alignment system is already known in which there is sent along an electrically conductive wire a short pulse with a time constant of one nanosecond. This pulse induces electrostatic charges between two metal plates by influence. A measurement of charge difference provides quantitative information on the deviation of the wire with respect to the median plane between the two plates.

Another taut wire alignment system is known in which a tungsten wire of diameter 125 μm and having a resistivity of 40 Ωm is subjected to a high frequency alternating voltage. Capacitive pick-up rings are disposed between guard segments connected to earth. These rings and the electronics are disposed in a screened case.

In these alignment systems, the conductivity of the taut wire is used for making measurements of the axial deviation, which excludes the use of materials having high electrical resistivity for making these wires.

SUMMARY OF THE INVENTION

The purpose of the invention is to overcome these disadvantages by proposing a method for measuring an axial deviation in an alignment system comprising a taut resistive wire which can, in particular, be made from a material having better mechanical characteristics than the materials currently used in taut wire deviation measuring devices.

According to the invention, the method comprises:

application of an alternating voltage signal to a measuring electrode provided with a guard electrode, this measuring electrode being disposed in a measuring plane on a holder attached to an element to be aligned and in the vicinity of the taut wire, this taut wire being dynamically connected to earth, measurement by means of a capacitive bridge, comprising a first capacitor consisting of the measuring electrode and the wire and a second predetermined capacitor, in order to provide a measurement signal representative of an axial position of the measuring electrode with respect to the taut wire along a first measuring axis normal to the said measuring plane, and processing of this measurement signal in order to provide information representative of an axial deviation of the element to be aligned with respect to a predetermined alignment position.

Thus, with the measuring method according to the invention, unlike the methods of the prior art which necessitated the use of a sufficiently conductive wire, it becomes possible to use a wire made of materials having higher electrical resistivity but better mechanical characteristics, thus making it possible to apply higher tension to the wire which is therefore more taut. A significant improvement in the measuring accuracy is then obtained, whilst using a strong wire which can have a total resistance of several tens of kΩ.

In a preferred form of implementation of the method according to the invention, first and second alternating voltage signals are respectively applied to first and second measuring electrodes respectively provided with guard electrodes and respectively disposed in first and second measuring planes located on either side of the reference axis, and the method furthermore comprises, for each measuring electrode, a capacitive bridge measurement to provide a signal representative of the capacity between the measuring electrode and the wire, and a differential processing of the said first and second signals representative of the capacities respectively corresponding to the first and second measuring electrodes in order to supply information representative of an axial deviation of the element to be aligned with respect to a predetermined positioning of alignment along a first measuring axis.

Preferably, the first and second measuring planes are substantially parallel, and there is obtained an axial deviation information on the element to be aligned with respect to a predetermined alignment position along a measuring axis normal to the said first and second measuring planes.

When it is necessary to measure an axial deviation along another axis, such as the vertical axis, the method according to the invention furthermore comprises at least one application of an alternating voltage signal to at least one other measuring electrode disposed in the vicinity of the taut wire in another measuring plane which is not parallel with the first measuring plane, a capacitive bridge measurement to provide at least one other measurement signal representative of an axial position of the other measuring electrode along another measuring axis normal to the other measuring plane, and a processing of this other signal in order to supply information representative of the axial deviation of the element to be aligned with respect to a predetermined alignment position along the said other measuring axis.

In a particular embodiment of the invention, the other measuring plane is not parallel with the first measuring plane and can, for example, be orthogonal to the latter.

According to another aspect of the invention, there is proposed a device for measuring an axial deviation in a taut wire alignment system, implementing the method according to one of the preceding claims, comprising a holder attached to an element to be aligned along a reference axis, characterized in that it comprises:

at least one measuring electrode provided with a guard electrode and disposed in a measuring plane located in the vicinity of a taut conductive wire connected to an earth, means of generating and applying an alternating voltage signal to this measuring electrode, with respect to the guard electrode, capacitive bridge means for supplying a measurement signal representative of an axial position of the measuring electrode with respect to the taut wire along a measuring axis normal to the said measuring plane, and means of processing this signal in order to supply information representative of an axial deviation of the element to be aligned with respect to a predetermined alignment position.

In a preferred version of the invention, the measuring device comprises at least two measuring electrodes respectively placed in two substantially orthogonal measuring planes.

In order to obtain better natural accuracy, the measuring device according to the invention comprises at least two measuring electrodes disposed respectively in two substantially parallel measuring planes on either side of the reference axis.

In an effective embodiment of a measuring device according to the invention, the latter furthermore comprises a central recess for receiving the taut wire, around which are disposed several measuring elements, each measuring element comprising an insulating holder on which the measuring electrode is disposed in the form of a thin layer.

In a practical embodiment, each measuring element comprises a part made of insulating material comprising, on its outer face, the measuring electrode and attached to a metal holder serving as a guard for this measuring electrode and which can have various geometric shapes.

The means of generation and the capacitive bridge means can be housed inside the device, in the immediate vicinity of the measuring electrodes, and disposed at least partially inside a screened enclosure which can be taken to a floating potential.

But, for certain applications and in difficult environments, particularly irradiated ones, all of the electronic equipments are located several meters away, the measuring device then being passive.

BRIEF DESCRIPTION OF THE DRAWINGS

Other features and advantages of the invention will furthermore appear in the following description. In the accompanying figures, given by way of non-limitative examples:

FIG. 1 is a descriptive view of an alignment system using axial displacement measuring devices according to the invention;

FIG. 2 is a cross-sectional view of a first embodiment of a measuring device according to the invention;

FIG. 2A is a partial view of a capacitive module within the device shown in FIG. 2;

FIG. 3 is a cross-sectional view of a second embodiment of a measuring device according to the invention; and FIG. 4 is a block diagram of an electronic processing unit associated with a capacitive module within a measuring device according to the invention.

DETAILED DESCRIPTION OF THE REFERRED EMBODIMENT

An example of the use of devices for measuring axial deviation according to the invention in a taut wire alignment system will now be described with reference to FIG. 1.

A taut wire alignment system 1 according to the invention comprises a set of deviation measuring devices 10, 11, hereafter referred to as deviation measurers, a wire 2 preferably made of carbon fibers, having high electrical resistivity and stretched at its two ends by tension equipment 5, 6, for example comprising pulleys and weights, electronic processing equipments 100, 110 and a central processing unit 120 for gathering the axial deviation information supplied by each deviation measurer 10, 11 and for sending control instructions 130 to positioning actuators (not shown) for the purpose of obtaining the sought alignment.

The deviation measurers 10, 11 are firmly attached to elements 3, 7 whose alignment is sought, for example to the vertical side faces 4, 8 of these elements. The wire 2 is stretched along a reference axis AR but in practice describes a catenary because of its own weight. It must however be noted that the use of a wire made of low-density carbon fibers rendered possible by the method according to the invention contributes to a considerable reduction of the catenary effect. The wire, 2 is electrically connected to earth or to a reference earth, either directly or indirectly by capacitive coupling. It is possible for example to provide a connection 12 to earth at a pulley 6.

A first embodiment of a deviation measuring device or deviation measurer according to the invention will now be described with reference to FIGS. 2 and 2A.

A deviation measurer 10 according to the invention comprises a conductive holder 280 connected to earth and attached to an outer side face 4 of an element to be aligned 3, a part 290 made of insulating material and a metal guard piece 200 having a U-shaped cross-section and receiving on its inner faces 261, 262 capacitive measuring elements 260, 270 between which passes the wire 2 which is electrically connected to earth by appropriate electrical connection means 12. The two capacitive measuring elements 260, 270, separated by a spacer element 201, are disposed facing each other on the two inner faces of the guard. Piece 200. Each capacitive measuring element 260, 270 can for example comprise, as shown in FIG. 2A, a measuring electrode 20, 22, deposited on a layer of insulating material 26, 27, for example alumina, disposed on the inner faces 261, 262 which serve as guards for the two measuring electrodes 20, 22. In a practical embodiment, the measuring electrodes are of substantially rectangular shape on round-shaped guard pieces. It is possible however to envisage many other geometric shapes both for the measuring electrodes and for the guard pieces.

By way of non-limitative example, it is possible to provide for the measuring electrodes to be made using a silk screen process or by any other technique for depositing a thin metal layer. Each capacitive measuring element 260, 270 defines a measuring plane P, P', including the measuring electrode 20, 22. The two measuring planes P, P' are preferably parallel and they are associated with, on the one hand, a first measuring axis X normal to the measuring planes and, on the other hand, a second measuring axis Z parallel with the measuring planes. In a configuration with two parallel measuring planes as shown in FIG. 2, only axial deviations along the first measuring axis X are measured. It is possible to choose, as a predetermined sought alignment position, a position of the element 3 such that the taut wire 2 is substantially coincident with a median axis A which is equidistant from the two measuring planes P, P'. The deviation measurer 10 can comprise, in situ, an electronic excitation and processing unit 24 included within the holder 200, in order to guarantee high measurement accuracy. Furthermore, it is advantageous to provide, on the base of the deviation measurer 10, a temperature sensor 240 for the purpose of compensating for the thermal expansion of the base by computation.

It is also possible to provide for carrying out all of the electronic processing in conditioning units or racks 100, 110 remote from the deviation measurers 10, 11 and connected to the latter by screened cables 25. This arrangement is imperative when the deviation measurers are installed in an environment affecting the functioning of the electronic equipments, for example a zone of strong irradiation.

In a second embodiment of a deviation measuring device according to the invention allowing measurement of deviation with respect to two orthogonal axes, a deviation measuring device or deviation measurer 30 comprises, with reference to FIG. 3, a frame 300 attached via an electrically insulating holder to an accessible face 4 of an element to be aligned 3, this frame 300 being made of electrically conductive material, comprising a central opening 350 through which the taut wire 2 passes and on the inner sides of which are disposed capacitive measuring elements 312, 322, 332, 342 which can have a geometry similar to that which has just been described. First and second capacitive measuring elements 322, 332 are disposed in two parallel measuring planes P, P' in order to measure an axial deviation x along a first measuring axis X, whilst third and fourth capacitive measuring elements 312, 242 are disposed in two other parallel measuring planes P'', P''' in order to measure an axial deviation z along a second measuring axis Z perpendicular to the first measuring axis. Each capacitive measuring element 312, 322, 332, 342 comprises a holder 31, 32, 33, 34 made of insulating material, for example ceramic, on which there has been deposited, for example by a silk screen process, a central measuring electrode 310, 320, 330, 340 and a guard electrode 311, 321, 331, 341. The measuring electrodes can for example be of rectangular shape and surrounded by guard electrodes having a rectangular frame shape. In one embodiment of a deviation measurer according to the invention, a remote unit 370 comprises electronic processing units 40 associated with each capacitive measuring element and connected to the latter by screened connecting cables 371, 372. These cables are, at the minimum, two coaxial cables whose core is connected to the measuring electrode and whose screen is connected to the corresponding guard. It is also possible to provide triaxial cables comprising an additional screen connected to earth.

With each capacitive measuring element 400, there is associated an electronic excitation and processing unit 40 for supplying information representative of an axial deviation of an element to be aligned with respect to a predetermined sought alignment position. This unit 40 can comprise, according to known techniques, floating oscillators 43 and a guard enclosure 50 comprising a capacitive bridge produced from an operational amplifier 42 having its negative input connected via the floating oscillators 43 to the measuring electrode 20, its positive input connected to earth and its output connected via a feedback capacitor 41 to its negative input. The guard enclosure 50, connected to earth, also includes a demodulator 45 disposed at the output of a level amplifier 44 downstream of the operational amplifier 42, and a modulator 47 disposed at the output of an integrator 46 downstream of the demodulator 45. The output of the demodulator 47 is applied to the negative input of the operational amplifier 42 through a reference capacitor 49. The modulator 47 and the demodulator 45 are synchronised from floating oscillators 43. The output voltage signal Vs, taken at the output of the integrator 46, is generally digitized and subjected to processing using, for example, a $3^{rd}$ order linear regression.

In an effective embodiment of a deviation measurer according to the invention comprising two capacitive measuring sensors such as shown in FIG. 2, the following metrological characteristics have been obtained:

travel along the X axis: ±1.25 mm, the zero being at the center of the two sensors 260, 270, displacement along the Z axis: ±2 mm, the zero being placed 14 mm from the spacer 201;

average sensitivity: 4 mV/$\mu$m;

measurement noise: 0.1 $\mu$m/VHz peak-to-peak;

passband: 80 Hz;

The wire used in this embodiment has a diameter of 0.3 mm and a total resistance of 50 KΩ.

In maximal use, corresponding to a deviation of the wire over the totality of both travels, along the X axis and along the Z axis:

natural linearity: ±8 $\mu$m;

residual errors after $3^{rd}$ order regression: ±0.5 $\mu$m;

the invention is of course not limited by the examples which have just been described and many developments can be applied to these examples without departing from the scope of the invention. Thus, the measuring and guard electrodes can have different geometries from those which have just been described. The electrode can also be made by the printed circuit technique or by mechanical assembly. The deviation measuring devices according to the invention can be disposed with respect to the elements to be aligned using any attachment technique whatsoever.

What is claimed is:

1. Method for measuring an axial deviation in a taut wire alignment system, said alignment system comprising a resistive wire stretched along a reference axis and disposed in the vicinity of elements to be aligned, comprising the steps of:

applying an alternating voltage signal to a measuring electrode being disposed in a measuring plane on a holder attached to an element to be aligned and in the vicinity of the taut wire, said taut wire being electrically connected only to ground, measuring a capacitance between said measuring electrode and said wire, implementing a capacitive bridge including a first capacitor constituted by said measuring electrode and said wire and a second predetermined capacitor, generating from said capacitance measurement a measurement signal representative of an axial position of the measuring electrode with respect to said wire along a first measuring axis normal to said measuring plane, and processing said measurement signal to provide information representative of an axial deviation of the element to be aligned with respect to a predetermined alignment position.

2. Method according to claim 1, wherein first and second alternating voltage signals are respectively applied between a first measuring electrode and said wire, and between a second measuring electrode and said wire, said first and second measuring electrodes being respectively disposed in first and second measuring planes located on either side of the taut wire, and in that it furthermore comprises, for each measuring electrode, steps of capacitive measurement to provide a signal representative of the capacity between said measuring electrode and said wire, and steps of differential processing of said first and second signals representative of the capacities respectively corresponding to said first and second measuring electrodes in order to provide information representative of an axial deviation of the element to be aligned with respect to a predetermined position of alignment.

3. Method according to claim 2, wherein the first and second measuring planes (P, P') are substantially parallel, and wherein there is obtained axial deviation information on the element to be aligned (3, 7) with respect to the predetermined alignment position along the first measuring axis (X) normal to the said first and second measuring planes.

4. Method according to claim 1, further comprising at least one application of an alternating voltage signal to at least one other measuring electrode (310, 340) disposed in the vicinity of the taut wire (2) in another measuring plane (P", P"') which is not parallel with the first measuring plane (P, P'), a capacitive bridge measurement to provide at least one other measurement signal representative of an axial position of the said other measuring electrode (310, 340) along another measuring axis (Z) normal to the other measuring plane (P", P"'), and a processing of this other signal in order to supply information representative of the axial deviation (z) of the element to be aligned (3) with respect to a predetermined alignment position along the said other measuring axis (Z).

5. Method according to claim 4, wherein the other measuring plane (P", P"') is not parallel with the first measuring plane (P, P').

6. Device (10, 11, 30) for measuring an axial deviation in a taut wire alignment system (1), implementing the method according to claim 1, comprising a holder (200) attached to an element to be aligned (3) along a reference axis (AR), said device comprising:

at least one measuring electrode (20, 22; 310, 320, 330, 340) provided with a guard electrode (21, 23, 311, 321, 331, 431) and disposed in a measuring plane (P, P', P", P."') located in the vicinity of a taut resistive wire (2) connected to ground, excitation means for generating and applying an alternating voltage signal to this measuring electrode (20, 22; 310, 320, 330, 340), with respect to earth, capacitive bridge means for supplying a measurement signal representative of an axial position of the measuring electrode (20) with respect to the taut wire (2) along a measuring axis (X) normal to the said measuring plane (P), and means for processing this signal in order to supply information representative of an axial deviation of the element to be aligned (3) with respect to a predetermined alignment position.

7. Measuring device (30) according to claim 6, comprising at least two measuring electrodes (310, 320, 330, 340) respectively placed in two substantially orthogonal measuring planes (P, P'; P", P"').

8. Measuring device (10, 30) according to claim 6, comprising at least two measuring electrodes (20, 22; 310, 340; 320, 330) disposed respectively in two substantially parallel measuring planes (P. P'; P", P"') on either side of the taut wire (2).

9. Measuring device (10, 30) according to claim 6, comprising a central space (250, 350) for receiving the taut wire (2), around which are disposed several measuring elements (260, 270; 312, 322, 332, 342), each measuring element (260, 270; 312, 322, 332, 342) comprising an insulating holder (26, 27; 31, 32, 33, 34) on which the measuring electrode (20, 22; 310, 320, 330, 340) and the guard electrode (21, 23; 311, 312, 331, 341) are disposed in the form of thin layers.

10. Measuring device (30) according to claim 9, further comprising a frame (300) made of electrically conductive material attached by a holder made of electrically insulating material (36) to an outer face (4) of an element to be aligned (3), inner faces of this frame being provided with capacitive measuring elements (312, 322, 332, 342).

11. Measuring device (10) according to claim 6, wherein the excitation means and the capacitive bridge means (24) are housed within the said device (10), in the vicinity of the measuring and guard electrodes.

12. Measuring device (30) according to claim 9, wherein the excitation means and the capacitive bridge means are disposed away from the measuring device (30) and are connected to the latter by screened cable means (371, 372).

13. Measuring device (10) according to claim 6, wherein the measuring electrode (20) is produced by a silk screen process.

14. Measuring device (10, 30) according to claim 6, wherein the processing means (40) are at least partially disposed in a screened enclosure (50) placed at a floating electrical potential and connected to the guard electrode.

15. Taut wire alignment system (1) including axial deviation measuring devices (10, 11, 30) according to claim 6, wherein the taut wire (2) is made of carbon fibers having high tensile strength.

* * * * *